US011913235B1

(12) United States Patent
Arguelles (10) Patent No.: US 11,913,235 B1
(45) Date of Patent: *Feb. 27, 2024

(54) SYNTHETIC MECHANICALLY ATTACHED ROOF UNDERLAYMENT SYSTEM

(71) Applicant: Daniel Efrain Arguelles, Miami, FL (US)

(72) Inventor: Daniel Efrain Arguelles, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,098

(22) Filed: Dec. 7, 2022

Related U.S. Application Data

(63) Continuation of application No. 17/304,146, filed on Jun. 15, 2021, now abandoned, which is a continuation of application No. 16/709,294, filed on Dec. 10, 2019, now Pat. No. 11,035,130.

(51) Int. Cl.
| | |
|---|---|
| *E04F 13/21* | (2006.01) |
| *E04D 5/14* | (2006.01) |
| *E04D 12/00* | (2006.01) |
| *F16B 15/02* | (2006.01) |
| *E04B 1/38* | (2006.01) |
| *E04D 1/34* | (2006.01) |

(52) U.S. Cl.
CPC .............. *E04F 13/21* (2013.01); *E04D 5/145* (2013.01); *E04D 12/002* (2013.01); *F16B 15/02* (2013.01); *E04B 2001/389* (2023.08); *E04D 2001/3423* (2013.01)

(58) Field of Classification Search
CPC ........ E04B 1/40; E04B 7/00; E04B 2001/405; E04D 1/34; E04D 12/002; E04D 13/00; E04D 2001/3423; E04D 5/144; E04D 5/145; E04F 13/21; E04G 21/328; F16B 9/00; F16B 9/026; F16B 43/00; F16B 15/02; F16L 3/105; F24S 25/00; H02S 40/30; Y02B 10/20
See application file for complete search history.

(56) References Cited

U.S. PATENT DOCUMENTS

| | | | |
|---|---|---|---|
| 451,550 A | 5/1891 | Bayer |
| 511,859 A | 1/1894 | Montross |
| 540,913 A | 6/1895 | Hille |
| 540,391 A | 8/1895 | Hille |

(Continued)

FOREIGN PATENT DOCUMENTS

| | | |
|---|---|---|
| CA | 2329838 | 10/1999 |
| DE | 29610674 | 10/1996 |

(Continued)

*Primary Examiner* — Jessie T Fonseca
(74) *Attorney, Agent, or Firm* — MALLOY & MALLOY, P.L.

(57) ABSTRACT

An underlayment system for a roof structure including underlayment material disposed in covering relation to a roof deck and a plurality of mechanical fasteners disposed and structured to interconnect the underlayment material to the roof deck. Each mechanical fastener includes an outer plate, an under plate and a connector penetrating through both the outer plate and under plate in secured relation to the roof structure. The under plate is disposed and structured to sealing engage the connector penetrating there through. The under plate is further disposed in engagement with an undersurface of said outer plate and beneath and in segregating relation between an outer peripheral edge of the outer plate and the underlayment material.

17 Claims, 10 Drawing Sheets

(56) References Cited

U.S. PATENT DOCUMENTS

| | | |
|---|---|---|
| 544,770 A | 8/1895 | Plympton |
| 553,321 A | 1/1896 | Taylor |
| 880,012 A | 2/1908 | Christensen |
| 1,155,559 A | 10/1915 | Franklin |
| 1,251,960 A | 1/1918 | Ames et al. |
| 1,709,376 A | 4/1929 | Shidey |
| 1,800,150 A | 4/1931 | Musgrave et al. |
| 1,826,082 A | 10/1931 | Mastick |
| 1,967,764 A | 7/1934 | Brown |
| 2,035,921 A | 3/1936 | Quinn |
| 2,039,536 A | 5/1936 | Johnson |
| 2,079,308 A | 5/1937 | Walton |
| 2,100,505 A | 11/1937 | Gimeno |
| 2,160,548 A | 6/1939 | Kawamura |
| 2,230,555 A | 2/1941 | Wright |
| 2,250,482 A | 7/1941 | Harshberger |
| 2,520,499 A | 8/1950 | Golaz |
| 2,984,945 A | 5/1961 | Campbell |
| 3,760,546 A | 9/1973 | Martin et al. |
| 3,848,383 A | 11/1974 | Wilson et al. |
| 3,899,855 A | 8/1975 | Gadsby |
| 4,028,450 A | 6/1977 | Gould |
| 4,083,360 A | 4/1978 | Courvoisier et al. |
| 4,192,287 A | 3/1980 | James |
| 4,291,680 A | 9/1981 | White |
| 4,299,201 A | 11/1981 | Tsubota |
| 4,336,793 A | 6/1982 | Ahearn et al. |
| 4,369,836 A | 1/1983 | Bleckmann |
| 4,389,826 A | 6/1983 | Kelly |
| 4,470,406 A | 9/1984 | Rinklake et al. |
| 4,544,695 A | 10/1985 | Tomason |
| 4,712,338 A | 12/1987 | Trickel |
| 4,716,701 A | 1/1988 | Talbot |
| 4,800,675 A | 1/1989 | Feil et al. |
| 4,932,184 A | 6/1990 | Waller |
| 5,165,213 A | 11/1992 | Finch et al. |
| 5,215,805 A | 6/1993 | Pavia, Jr. |
| 5,392,584 A | 2/1995 | Perez-Wilson |
| 5,409,549 A | 4/1995 | Mori |
| 5,465,547 A | 11/1995 | Jakel |
| 5,651,226 A | 7/1997 | Archibald |
| 5,788,831 A | 8/1998 | Melchoir |
| 5,797,581 A | 8/1998 | Sherman |
| 5,800,891 A | 9/1998 | Wasitis |
| 5,837,363 A | 11/1998 | Colafati |
| 5,927,028 A | 7/1999 | Rossi |
| 6,000,393 A | 12/1999 | Moore |
| 6,125,602 A | 10/2000 | Freiborg et al. |
| 6,145,272 A | 11/2000 | Tomaini |
| 6,152,377 A | 11/2000 | Fiedrich |
| 6,182,403 B1 | 2/2001 | Mimura et al. |
| 6,245,987 B1 | 6/2001 | Shiomi et al. |
| 6,606,823 B1 | 8/2003 | McDonough et al. |
| 6,708,463 B2 | 3/2004 | Chai |
| 6,862,842 B2 | 3/2005 | Mischo |
| 6,920,730 B2 | 7/2005 | Becker et al. |
| 6,948,288 B1 | 9/2005 | Smith |
| 7,249,443 B2 | 7/2007 | Faulkner et al. |
| 7,299,591 B2 | 11/2007 | Broatch |
| 7,513,084 B2 | 4/2009 | Arguelles |
| 7,870,700 B2 | 1/2011 | Arguelles |
| 8,104,231 B1 | 1/2012 | Graboski |
| 8,137,170 B2 | 3/2012 | Klement |
| 8,201,382 B1 | 6/2012 | Pao |
| 8,196,369 B2 | 8/2012 | Pao et al. |
| 8,468,756 B2 | 6/2013 | Arguelles |
| 8,875,454 B2 | 11/2014 | Arguelles |
| 9,479,110 B2 | 10/2016 | Patton et al. |
| 9,663,955 B2 | 5/2017 | Arguelles |
| 11,035,130 B1 | 6/2021 | Arguelles |
| 2004/0074153 A1 | 4/2004 | Ceria |
| 2004/0144060 A1 | 7/2004 | Becker et al. |
| 2005/0045317 A1 | 3/2005 | Huebner et al. |
| 2005/0055932 A1 | 3/2005 | Hubbard |
| 2005/0102847 A1 | 5/2005 | McCaskill et al. |
| 2005/0183261 A1 | 8/2005 | Nebesnak et al. |
| 2005/0246971 A1 | 11/2005 | Ortega |
| 2006/0070621 A1 | 4/2006 | Neumann et al. |
| 2006/0088398 A1 | 4/2006 | Lund |
| 2006/0277846 A1 | 12/2006 | Olsson |
| 2007/0022692 A1 | 2/2007 | Friedman et al. |
| 2007/0053768 A1 | 3/2007 | Durig |
| 2007/0077838 A1 | 4/2007 | Binkley et al. |
| 2007/0107358 A1 | 5/2007 | Stone |
| 2007/0289242 A1 | 12/2007 | Arguellas |
| 2007/0289243 A1 | 12/2007 | Arguelles |
| 2008/0083176 A1 | 4/2008 | Barsun et al. |
| 2008/0245403 A1 | 10/2008 | Stimson et al. |
| 2009/0007514 A1 | 1/2009 | Kassem |
| 2009/0223550 A1 | 9/2009 | Curtin et al. |
| 2009/0255201 A1 | 10/2009 | Kraus et al. |
| 2009/0308020 A1 | 12/2009 | Duke |
| 2010/0024803 A1 | 2/2010 | Volcan |
| 2010/0064605 A1 | 3/2010 | Corvaglia et al. |
| 2010/0139184 A1 | 6/2010 | Williams et al. |
| 2010/0236542 A1 | 9/2010 | Pierson et al. |
| 2010/0246403 A1 | 9/2010 | Wang |
| 2010/0287852 A1 | 11/2010 | Bortoletto |
| 2011/0094169 A1 | 4/2011 | Bellavia |
| 2011/0162779 A1 | 7/2011 | Stanley |
| 2012/0061046 A1 | 3/2012 | Goodrich et al. |
| 2013/0009025 A1 | 1/2013 | Stearns |
| 2013/0298494 A1 | 11/2013 | Corsi |
| 2015/0361668 A1 | 12/2015 | Stearns et al. |
| 2017/0299102 A1 | 10/2017 | Ash et al. |
| 2018/0106289 A1 | 4/2018 | Ash et al. |

FOREIGN PATENT DOCUMENTS

| | | |
|---|---|---|
| EP | 1041647 | 10/2000 |
| FR | 546505 | 11/1922 |
| FR | 993634 | 11/1951 |
| FR | 2151474 | 4/1973 |
| FR | 2505910 | 11/1982 |
| FR | 2592673 | 1/1987 |
| FR | 2568917 | 2/1988 |
| GB | 82141157 | 12/1984 |
| GB | 2483457 | 3/2012 |
| JP | 357098752 | 6/1982 |
| JP | 402016242 | 1/1990 |
| JP | 2001128555 | 5/2001 |
| JP | 2002084872 | 3/2002 |
| WO | WO2006125985 | 11/2006 |
| WO | WO2007149369 | 12/2007 |
| WO | WO2008020462 | 2/2008 |
| WO | WO2008052816 | 6/2008 |
| WO | WO2009053813 | 4/2009 |
| WO | WO2010100663 | 9/2010 |
| WO | WO2011030127 | 3/2011 |
| WO | WO2011048565 | 4/2011 |

SYNTHETIC MECHANICALLY ATTACHED ROOF UNDERLAYMENT SYSTEM

CLAIM OF PRIORITY

The present application is a Continuation of previously filed application having Ser. No. 17/304,146 filed on Jun. 15, 2021, which is a Continuation of previously filed application having Ser. No. 16/709,294, which matured into U.S. Pat. No. 11,035,130 on Jun. 15, 2021, which claims priority pursuant to 35 U.S.C. § 119(e) to U.S. Provisional Patent Application Ser. No. 62/800,166 filed on Feb. 1, 2019, the contents of which are incorporated herein, by reference, in their entirety.

BACKGROUND OF THE INVENTION

Field of the Invention

The present invention is directed to an underlayment system for a roof structured to increase wind uplift performance through the utilization of a plurality of mechanical fasteners disposed in securing relation to an underlayment material overlying a roof deck or other support structure of the roof.

Description of the Related Art

In modern day construction, roof covering systems typically include an underlying, supporting deck or like support structure. This underlying support structure is covered by a waterproof or leak resistant material that may take various forms. In addition, roof tiles, shingles and like roof coverings are frequently arranged and secured in overlapping relation to one another so as to collectively overlie the roof deck or like underlying roof support structure. Further, the water-resistant covering applied to the outer surface of the roof deck serves to secure the plurality of exterior roof tiles directly to the underlying support. Alternatively, other materials such as cement, polyurethane, "poly-foam", etc. may be utilized to secure or fix an underlying layer of roof tiles, shingles, etc. directly to the outer layer. As such, a roofing system, as generally described above, facilitates a water-resistant roofing assembly as well as an outer or exterior, aesthetically pleasing roof covering.

However, one constant and continuous area of concern is the structure and procedure utilized in the installation of a roofing system specifically including the roofing tiles or like roof covering materials. In typical fashion, roof tiles may include an underlying tile disposed in laterally adjacent relation to one another and arranged in longitudinally adjacent rows or columns, especially when the roofing system is applied to a slanted or sloped roof. Moreover, an outer array of roof tiles is disposed in overlapping, at least partially supported relation on the underlying tiles. As such, the underlying tiles and outer roof tiles make up the exposed covering of the roof deck or like underlying roofing support structure.

In known or conventional roofing systems of the type generally described above, it is recognized in the roofing industry that time, labor and materials associated with installation, including securing the underlayment material to the roof deck or roof support structure is significant and sometimes prohibitive. Moreover, many of the underlayment structures and materials, including those of the type set forth above are expensive to use.

Therefore, in order to overcome the problems and disadvantages in the roofing industry, including at least some of those indicated herein, there is a need for an economic, high-performance underlayment system which is structurally operative to enhance wind uplift performance through the utilization of a plurality of mechanical fasteners. The structural features of the proposed and improved mechanical fasteners will serve to minimize a "blanketing effect" in high wind zones. In addition, the utilization of mechanical fasteners, with a variety of different underlayment materials, facilitates the establishment of a platform for solar thermal tubing and thin-film photovoltaics for use in foam adhered metal and tile roof assemblies.

While the use of mechanical fasteners is at least generally known, there is a need in the roofing industry for an improved mechanical fastener. Such an improved mechanical fastener should include structural and operative features, useable in combination with a variety of different or preferred underlayment materials, in a manner which eliminates or significantly reduces the possibility of leakage at their points of attachment with the underlayment material. Yet additional features of a proposed one or more embodiments of a preferred mechanical fastener is the elimination of tearing or ripping of the underlayment material by the mechanical fastener itself. As a result, eliminating such damage helps prevent leakage through the points of penetration or attachment of the mechanical fasteners to the underlayment material.

SUMMARY OF THE INVENTION

The present invention is directed to an economically beneficial, high-performance underlayment system structurally operative to increase wind uplift performance, through the use of a plurality of self-sealing mechanical fasteners. As practically applied, the mechanical fasteners serve to effectively secure a variety of different types of underlayment material in overlying relation to a roof deck or like support for the remainder of the roof structure. As a result, a "blanketing effect" is minimized in high wind zones. In addition, the underlayment system at least partially defines an enhanced platform for solar thermal tubing and thin-film photovoltaics, as used in foam adhered metal roofs and tile roof assemblies.

In more specific terms, the underlayment system of the present invention comprises an underlayment material including, but not limited to, synthetic underlayment material, disposed in covering relation to a roof deck or other underlying support for the remainder of the roof structure. At least one, but more practically a plurality of the aforementioned mechanical fasteners are disposed in interconnecting relation to the underlayment material and the roof deck or like roof support. Each of the one or more mechanical fasteners includes an outer plate, an under plate and a connector. When assembled in the aforementioned interconnecting relation, the connector is disposed in penetrating relation through both the outer plate and the under plate and is secured to the roof deck or like support structure, beneath the underlayment material. Non-limiting examples of the synthetic underlayment material may include, but are not limited to, products sold under the trademark Rex Synfelt®, SharkSkin Ultra®, SharkSkin Ultra SA® as well as others and/or a combination thereof.

One feature of the present invention is the dimensioning, configuring and overall structuring of the under plate to extend beneath and along an entirety of an outer periphery and/or outer peripheral edge of the outer plate. In such an operative position, the under plate is disposed in segregating relation between the outer peripheral edge of the outer plate and the underlayment material.

More specifically, the under plate is disposed beneath and in engagement with an undersurface of the outer plate including an entirety of the outer peripheral edge of the outer plate. Simultaneously, the under plate is disposed in overlying engagement with a correspondingly disposed portion of the underlayment material, which the corresponding connector penetrates.

As described in greater detail hereinafter, each and/or different ones of the plurality of mechanical fasteners may be defined by different structural modifications. As such, the outer plate and the under plate may be fixedly secured to one another and be collectively and concurrently disposed in retaining position to the underlayment material as a single, integrated unit. Further, in this embodiment the outer plate and the under plate may include substantially commonly disposed, configured and dimensioned outer peripheral edges. Further, the outer peripheral edge of the under plate is disposed in segregating relation between the underlayment material and the outer peripheral edge of the outer plate. However, structural modifications of this integrated mechanical fastener may also include the outer periphery or outer peripheral edge of the under plate disposed in outwardly extending, surrounding relation to the outer peripheral edge of the outer plate. As should be apparent, this is accomplished by the under plate having a larger diameter, transverse dimension and corresponding periphery than that of the outer plate.

Yet another embodiment of the one or more mechanical fasteners comprises the outer plate and the under plate being, at least initially, independent separate structures and at least originally separable from one another. In this embodiment, the connector, due to its concurrent penetration of both the inner and outer plates, serves to mechanically attach them to one another and to the underlayment material. Similar to the above noted integrated mechanical fastener structure, the under plate includes an outer periphery or outer peripheral edge disposed in segregating relation between the outer peripheral edge of the outer plate and the underlayment material. Further, the outer periphery of the under plate may have a greater transverse dimension and corresponding outer periphery, such that the outer peripheral edge thereof may extend outwardly in surrounding relation to an entirety of the outer peripheral edge of the outer plate.

Additional structural features of at least one embodiment of the present invention may include the under plate being formed from an at least partially flexible material and being magnetic or capable of being magnetized. The magnetic capabilities of the material of the under plate may be due to the inclusion of a metallic material therein. At least one example of the material from which the under plate is formed may be barium ferrite. In more specific terms at least one embodiment of the under plate comprises a base material of 89% isotropic barium ferrite; 10% chlorinated polyethylene; 0.3% oil and 0.5% of a coupler.

In cooperation therewith, the outer plate is formed from an at least partially rigid or semi rigid, yet partially flexible, material such as a metallic material, including tin, aluminum, etc. The degree of rigidity should be such as to facilitate maintenance of the one or more mechanical fasteners in their intended retaining relation to the corresponding portion of the underlayment material being engaged. In cooperation therewith, the under plate may be formed of an at least partially flexible material having structural characteristics which facilitate maintenance of a given mechanical fastener in its intended retaining relation to the corresponding portion of the underlayment system, as set forth above.

Yet additional features of each of the preferred embodiments of the one or more mechanical fasteners, as generally described above, include the under plate and the material from which it is formed having self-sealing capabilities at least relative to the connector penetrating therethrough. As used herein, the term "self-sealing" in regard to the material of the under plate is meant to describe the under plate being disposed in sealing engagement with the exterior of the connector passing therethrough. Such sealing engagement prevents or at least significantly restricts the passage of water through the under plate at the point of its engagement with the connector. Such "self-sealing" capabilities of the one or more mechanical fasteners serves to eliminate or significantly reduce the occurrence of leakage through the underlayment at the point or location where the connector of each mechanical fastener penetrates and/or passes through the underlayment material.

Supplementary advantages in using a plurality of mechanical fasteners in retaining engagement with an underlayment material, as described herein, include adding to the "texture" of the exposed surface of the underlayment material. More specifically, the exterior or exposed outer surfaces of synthetic underlayment materials are considered to be relatively smooth. In fact, the "texture" of the exterior surfaces is tested for "tile slippage", limiting their use to 5/12 and 6/12 slopes. However, even at that slope there is still the possibility that stacked tiles may slip forwardly. The presence of a plurality of spaced apart mechanical fasteners afford a sufficient "texture" to arrest a tile stack from slipping forwardly. Such an increase in texture also facilitates foot traffic over an exposed surface of the underlayment material, by reducing the possibility of slippage.

Structural and operative features of the underlayment system of the present invention also include the utilization of a plurality of retainer clips. One or more of the retainer clips is formed of a metallic material and is operatively positioned, by being magnetically connected, concurrently to two of the plurality of mechanical fasteners, which are magnetized as set forth above. When so operatively disposed, the two magnetized mechanical fasteners engaging a corresponding retainer clip are disposed in spaced, adjacent relation to one another. Further, one or more of the retainer clips comprises a substantially U-shaped segment disposed in spaced, overlying relation to the underlayment material. As such, the U-shaped segment is disposed and structured to retain an object or structure specifically including, but not limited to, a portion of a solar tube or conduit in an intended location on the underlayment material.

Yet another structural modification contemplated, which is in the intended spirit and scope of the present invention is the separation of the under plate and the outer plate. In more specific terms, the under plate may be attached directly to the underlayment material or at least partially embedded therein. In cooperation there with, the outer layer may be disposed in overlying, substantially aligned relation to the under plate while it is attached to or embedded at least partially within the underlayment material. When cooperatively oriented in this operative position the connector is disposed in penetrating relation to both the exposed outer plate and the under plate, concurrent to the under plate being attached to or at least partially embedded within the underlayment material. In this structural modification the under plate would still include the structural and operative characteristics and features as described hereinafter in the other embodiments of the system of underlayment for a roof structure. It is further contemplated that the under plate may be used independently of the outer plate while still being attached to or at least partially embedded within the underlayment material.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in FIGS. 2-5 the present invention is directed to an underlayment system for a roof structure incorporating at least one but more practically a plurality of mechanical fasteners generally indicated as 10 or 10' operatively positioned to retain a synthetic underlayment material 100 in covering relation to a roof deck or other underlying roof support structure 106.

Figure 1:
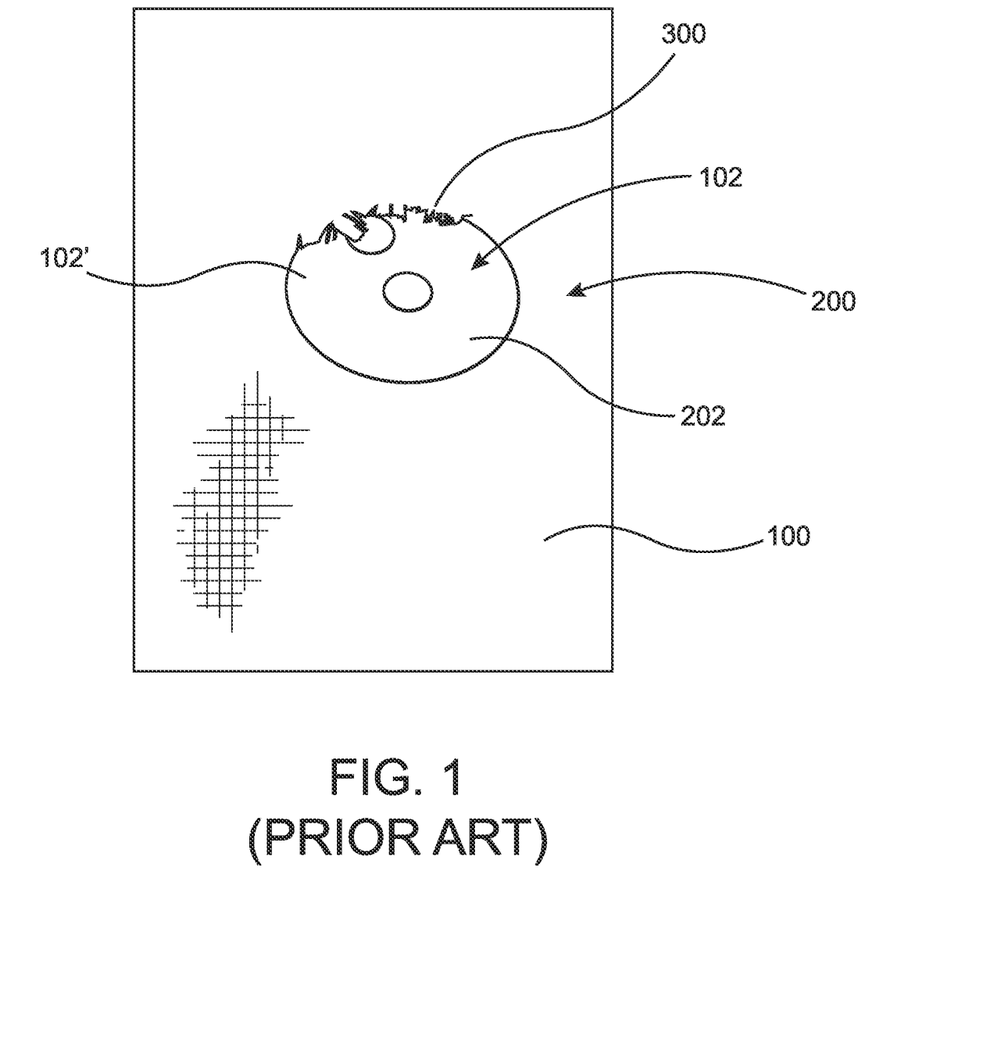
FIG. 1 is a perspective view of a prior art mechanical fastener causing damage to at least a portion of the underlayment material with which it is engaged.

However, for purposes of clarity in further emphasizing the inventive structural and operative features of the present invention, reference is initially directed to FIG. 1, being representative of a conventional, known and/or prior art mechanical fastener generally indicated as 200, disposed in retaining engagement with underlayment material 100. More specifically, one or more different types of mechanical fasteners 200 typically include a retaining member 202 connected in overlying engagement with the outer surface of the underlayment material 100. Securement of the retaining member 202 in its intended retaining position is accomplished by a connector 102 extending therethrough, in penetrating relation to the underlayment material 100.

As also represented in FIG. 1 the peripheral edge 102' of the conventional mechanical fastener 200 is exposed along at least a majority of its length. Further, the exposed peripheral edge 102' is disposed in at least partial engagement with the underlayment material 100. As a result, when uplifting forces are placed on the underlayment material 100 the outer peripheral edge 102' may cut into an engaged portion of the underlayment material 100 resulting in a rip, tear, puncture, etc. generally indicated as 300. Such damage may result in a leakage of water into and through the underlayment material 100 at the damaged section 300. Such leakage may occur even when the underlayment material 100 is intended to be "waterproof" or otherwise structured to resist water leakage there through.

In contrast, the synthetic underlayment system of the present invention, as represented in FIGS. 2-5, overcomes the disadvantages and problems of the type set forth above which are currently recognized as a problem by the roofing industry.

Figure 2:
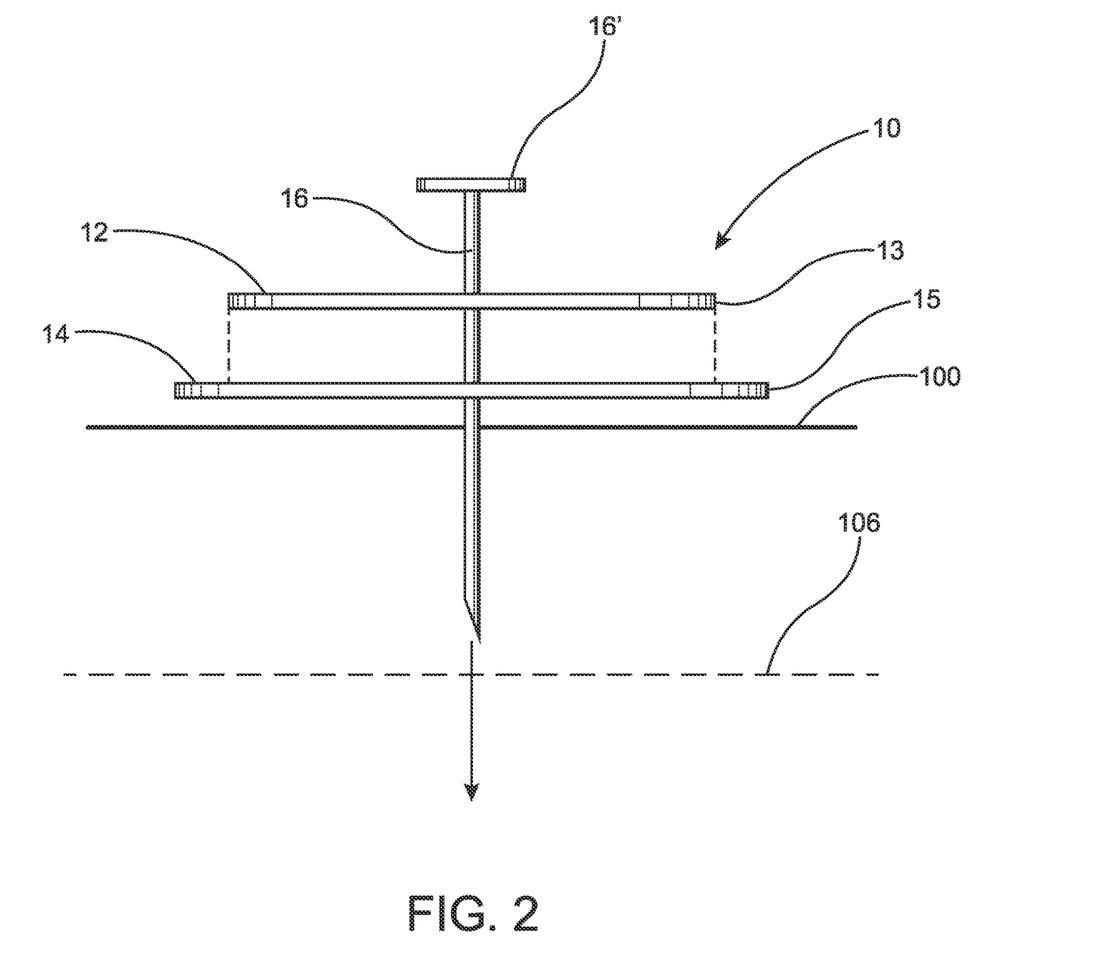
FIG. 2 is a schematic representation, in exploded form, of one preferred embodiment of a mechanical fastener of the underlayment system of the present invention, positioned for operative disposition relative to a synthetic underlayment material and supporting roof deck or other supporting structure.
Figure 3:
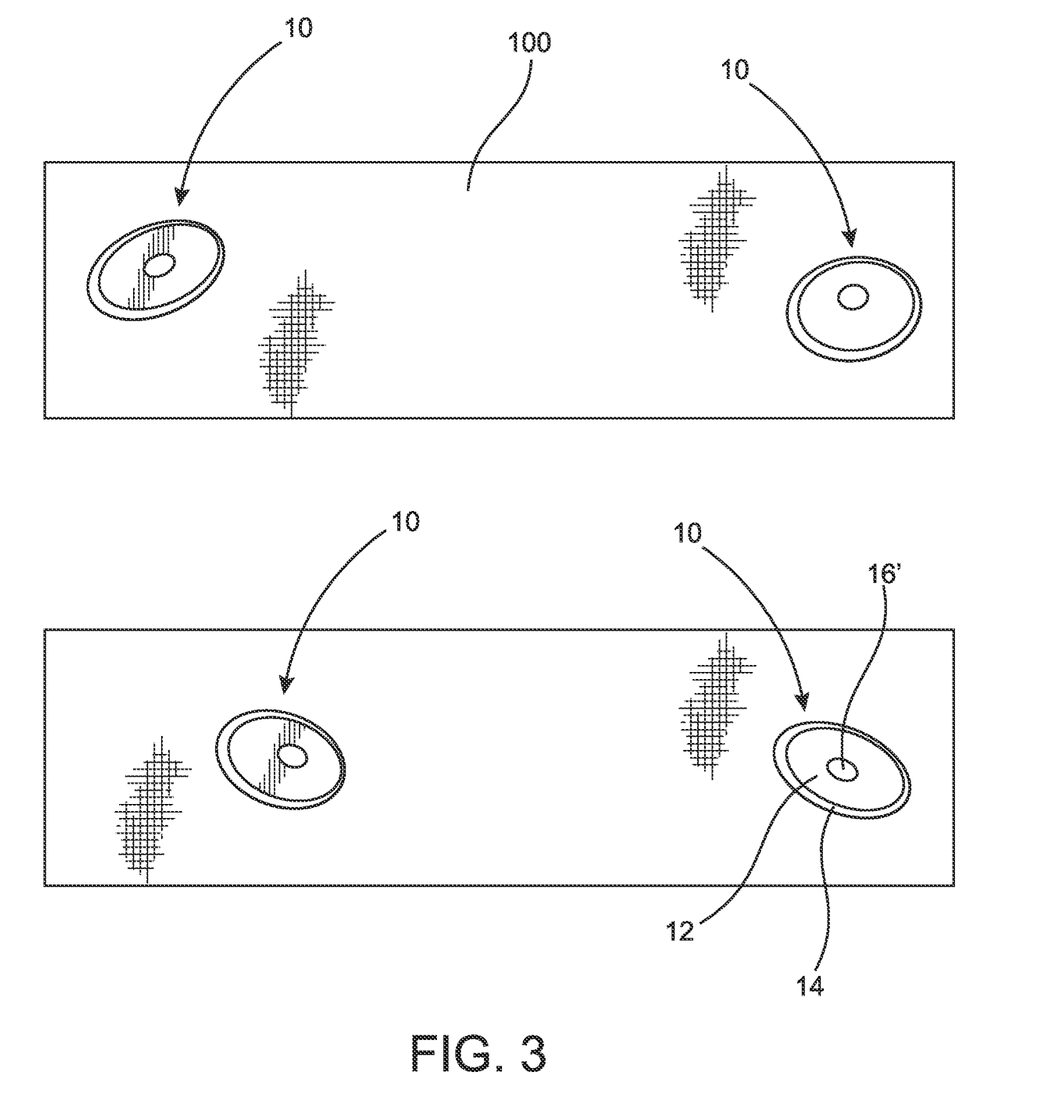
FIG. 3 is a perspective view of a plurality of the mechanical fasteners of the embodiment of FIG. 2 disposed in an operative retaining position relative to an underlayment material of a roof structure.

With primary reference to FIGS. 2 and 3, the underlayment system of the present invention incorporates the use of at least one but more practically a plurality of mechanical fasteners 10. As schematically represented in FIG. 2, the one or more mechanical fasteners 10 include an outer plate 12 and an under plate 14 as well as a connector 16. When assembled, the connector 16 penetrates through both the outer plate 12 and the under plate 14 and concurrently through the underlayment material 100. The connector 16 may then be concurrently attached, by penetration, to a roof deck or other underlying supporting support structure 106. In the embodiment of FIGS. 2 and 3, the outer plate 12 and the under plate 14 are at least initially independent, separable structures disposed in connected relation to one another by passage of the connector therethrough, into secure engagement with the roof deck or support structure 106.

Accordingly, the assembled, intended operative orientation of the one or more mechanical fasteners 10 are represented FIG. 3. As such, practical application includes a plurality of the mechanical fasteners 10 disposed in predetermined, spaced relation to one another and in retaining attachment to the underlayment material 100. In such an assembled operative disposition, each of the plurality of mechanical fasteners include the under plate 14 disposed in engaging relation to the undersurface of the outer plate 12 concurrently to being disposed in overlying, engaging, retaining relation to the outer surface of the underlayment material 100. As also indicated, the connector 16 concurrently penetrates through both the outer and under layers 12 and 14, the underlayment material 100 and into to secure attachment with the roof deck or other support structure 106 of the roof structure. As is also noted, the connector 16 includes a somewhat enlarged head 16' serving to maintain the operative engagement of the outer and under plates 12 and 14 with one another and in overlying retaining engagement to the underlayment material 100, as clearly represented in FIGS. 2 and 3. Further, the connector 16 could be in the form of an elongated nail, screw or other appropriate type connector, sufficient in dimension to penetrate the outer plate 12, the under plate 14, the underlayment material 100 and be secured at generally its distal end to the roof deck or other underlying support structure 106.

In order to eliminate or avoid the type of damage 300 represented in the prior art representation of FIG. 1, one feature of the mechanical fastener 10 includes the under plate 14 being dimensioned and configured for operative disposition in segregating relation between the outer peripheral edge 13 of the outer plate 12 and the underlayment material 100. More specifically, the dimension and configuration of the under plate 14 may be such as to extend beneath and along an entirety of the outer peripheral edge 13 of the outer plate 12, in the aforementioned segregating relation between the outer peripheral edge 13 and the underlayment material 100, as clearly represented in FIGS. 2 and 3.

As set forth above, when assembled in retaining engagement with the underlayment material 100 by the penetrating interconnection of the connector 16, the under plate 14 will be concurrently disposed in engaging relation with the undersurface of the outer plate 12 and the outer, exposed surface of the underlayment material 100. At the same time, the outer periphery and/or outer peripheral edge 15 of the under plate 14 extends outwardly from and in surrounding relation to the outer peripheral edge 13 of the outer plate 12.

Additional structural features of at least the embodiment of FIG. 2 include the under plate 14 being formed from an at least partially flexible material and being magnetic or capable of being magnetized. The magnetic capabilities of the material of the under plate 14 may be due to the inclusion of a metallic material. At least one example of a base material from which the under plate 14 is formed may be barium ferrite, as set for the in more detail herein. In cooperation therewith, the outer plate 12 is formed from an at least partially rigid or semi rigid, metallic material, such as, but not limited to, tin, aluminum, etc. The degree of rigidity of the outer plate 12 and/or a combined rigidity of the outer and under plates 12 and 14 should be such as to facilitate maintenance of the one or more mechanical fasteners 10 in their intended retaining engagement with the corresponding portion of the underlayment material 100 including when uplifting forces are exerted on the underlayment material 100.

Accordingly, when the outer plate 12 and the under plate 14 are brought into engagement with one another they will be magnetically, but still removably, connected to one another. Such magnetic capabilities of the mechanical fastener 10 facilitates a rapid and efficient placement of the initially separable outer plate 12 in overlying relation to the under plate 14 prior to the connector 16 being attached or penetrating therethrough. By way of example, a plurality of the under plates 14 can be initially and individually located in a desired location overlying the outer surface of the underlayment material 100. Thereafter, a plurality of outer plates 12 can be disposed in overlying relation to different ones of the under plates 14, facilitated by the magnetic attraction therebetween.

In order to facilitate application of a plurality of mechanical fasteners 10 in overlying, retaining relation to a corresponding underlayment material 100, they may be laid out, such as linearly, in a predetermined position prior to the connector 16 being inserted. However, when dealing with a sloped roof there is a recognized tendency for the pre-positioned mechanical fasteners 10, and or portions thereof to be displaced. Such displacement is particularly prevalent when previously positioned ones of the plurality of mechanical fasteners 10 are nailed or fixed in place, such as when a pneumatic nail gun or similar device is utilized. Accordingly, one additional embodiment of the one or more mechanical fasteners 10 is the inclusion of an adhesive which may be applied to the undersurface of the under plate 14. Such adhesive will facilitate the preplacement of a plurality of the mechanical fasteners 10 and a maintenance thereof in their intended position even when previously positioned mechanical fasteners 10 are nailed or fixed in place by a pneumatic nail gun or other tool. Such adhesive undersurface may be more specifically defined by a "peel and stick" application, where in the adhesive is additionally covered by a removable peel-away material.

When the adhesive embodiment of the mechanical fasteners 10 are utilized in combination with the magnetically attracted outer plate 12 and under plate 14, the adhesive material need be applied only to the undersurface of the under plate 14. However, as practically applied, when the magnetic attraction between the outer plate 12 and the under plate 14 is absent, an adhesive material may be applied to the undersurface of both the outer plate 12 and under plate 14. Therefore, when a plurality of the mechanical fasteners 10 are pre-applied, such as in an elongated configuration, the under plate 14 will be adhered to the outer surface of the underlayment material and the outer plate 12 will be adhered to the exposed surface of the under plate. Such adherence will prevent displacement of the pre-positioned mechanical fasteners 10 from their intended location, such as when a pneumatic nail gun or like instrument is used to fasten previously disposed mechanical fasteners 10, such as on a sloped roof.

Placement of either of the above noted embodiments is accomplished in a manner that assures the outer peripheral edge 15 of the under plate 14 is outwardly disposed in surrounding relation to the outer peripheral edge 13 of the outer plate 12 or is otherwise disposed to maintain a segregated relation between the outer peripheral edge 13 and the exposed portion of the underlayment material 100, as set forth above.

Figure 4:
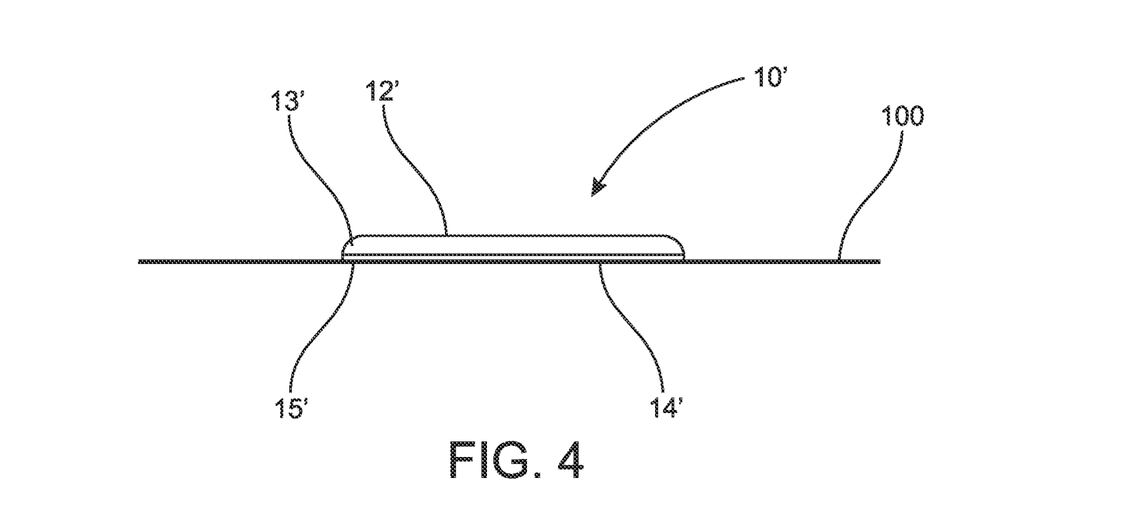
FIG. 4 is a side view of another embodiment of a mechanical fastener of the underlayment system of the present invention.

Each and/or different ones of the plurality of mechanical fasteners may be defined by different structural modifications. Accordingly, and with primary reference to FIG. 4, another preferred embodiment of the present invention includes a mechanical fastener 10' having different structural features, but at least some similar operational features. More specifically, the mechanical fastener 10' includes an outer plate 12' and an under plate 14' which are fixedly secured to one another. As such, the outer and under plates 12' and 14' may be operatively and collectively disposed in retaining position to the underlayment material 100 as a single, integrated unit. As also represented in FIG. 4, the outer plate 12' and the under plate 14' may include substantially commonly dimensioned, disposed and configured outer peripheral edges 13' and 15' respectively. As a result, the outer periphery and/or outer peripheral edge 15' of the under plate 14' is disposed in segregating relation between the underlayment material 100 and the outer peripheral edge 13' of the outer plate 12'. However, structural modifications of this integrated mechanical fastener 10' may also include the outer periphery 15' of the under plate 14' having a larger dimension than that of the outer peripheral edge 13' of the outer plate 12', in the manner demonstrated in the embodiment of FIG. 2. In this additional structural modification, the outer peripheral edge 15' would be dimensioned and configured to extend outwardly in surrounding relation to the outer peripheral edge 13' of the outer plate 12'. As such, the outer peripheral edge 13' of the outer plate 12' would be segregated from contact and/or engagement with the underlayment material 100.

While not represented in FIG. 4, it should be apparent that the mechanical fastener 10' is fixedly connected in overlying, retaining relation to the underlayment 100 through the utilization of a connector 16 penetrating through both the outer plate 12' and the under plate 14', in the manner represented in FIG. 2 and described in detail herein.

Due to the fact that the mechanical fastener 10' includes the outer plate 12' and the under plate 14' being fixedly connected, thereby defining an integrated unit, the material from which the under plate 14' is formed may or may not be magnetized and/or include magnetic capabilities. Accordingly, the material from which the under plate 14' is formed may also comprise barium ferrite.

Yet additional features of each of the mechanical fasteners 10 and 10' include the under plate 14 and 14' and the material from which they are formed having self-sealing capabilities, at least relative to the connector 16 penetrating therethrough. As used herein, the term "self-sealing" in regard to the under plate 14 and 14' is meant to describe the material thereof being disposed in sealing engagement with the exterior of the connector 16 passing therethrough. Such sealing engagement may be facilitated by the material of the under plate 14 and 14' being at least partially flexible. Further such sealing engagement prevents or at least significantly restricts leakage by restricting the passage of water through the under plate 14 and 14' at the point of its penetrated engagement with the connector 16. More specifically, the "self-sealing" capabilities of the one or more mechanical fasteners 10 and 10' serve to eliminate or significantly reduce the occurrence of leakage through the underlayment at the point or location where the connector 16 of each mechanical fastener 10 and 10' penetrates and/or passes there through.

Figure 5:
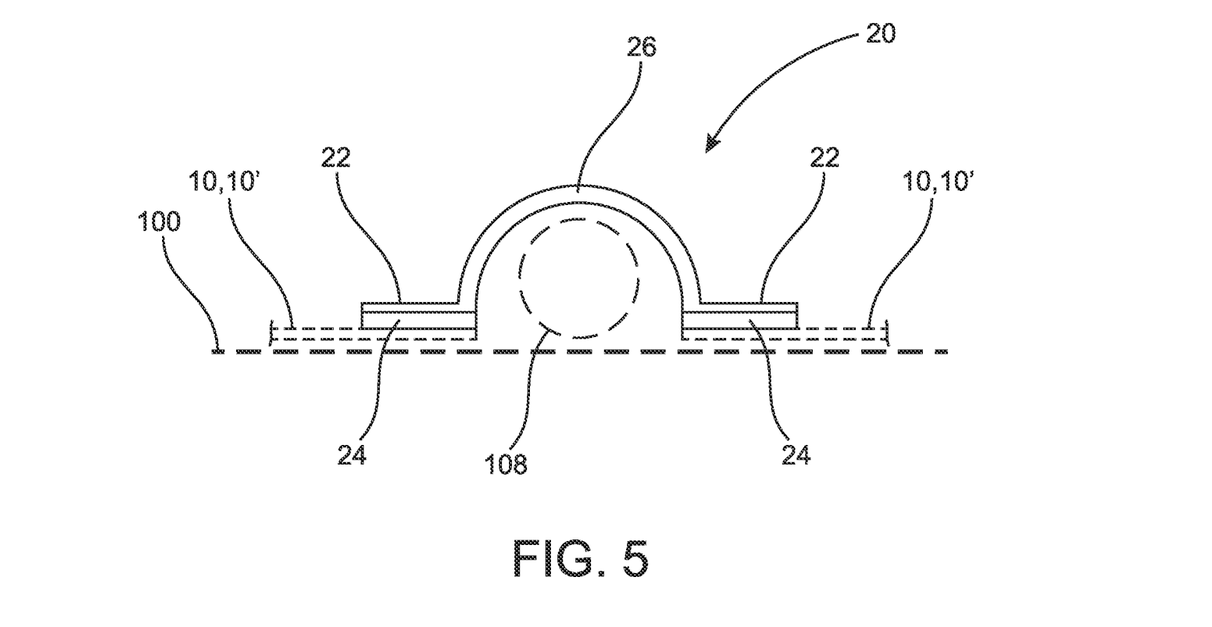
FIG. 5 side view of the retaining clip structure which may be operatively included within the underlayment system of the present invention.
Figure 6A:
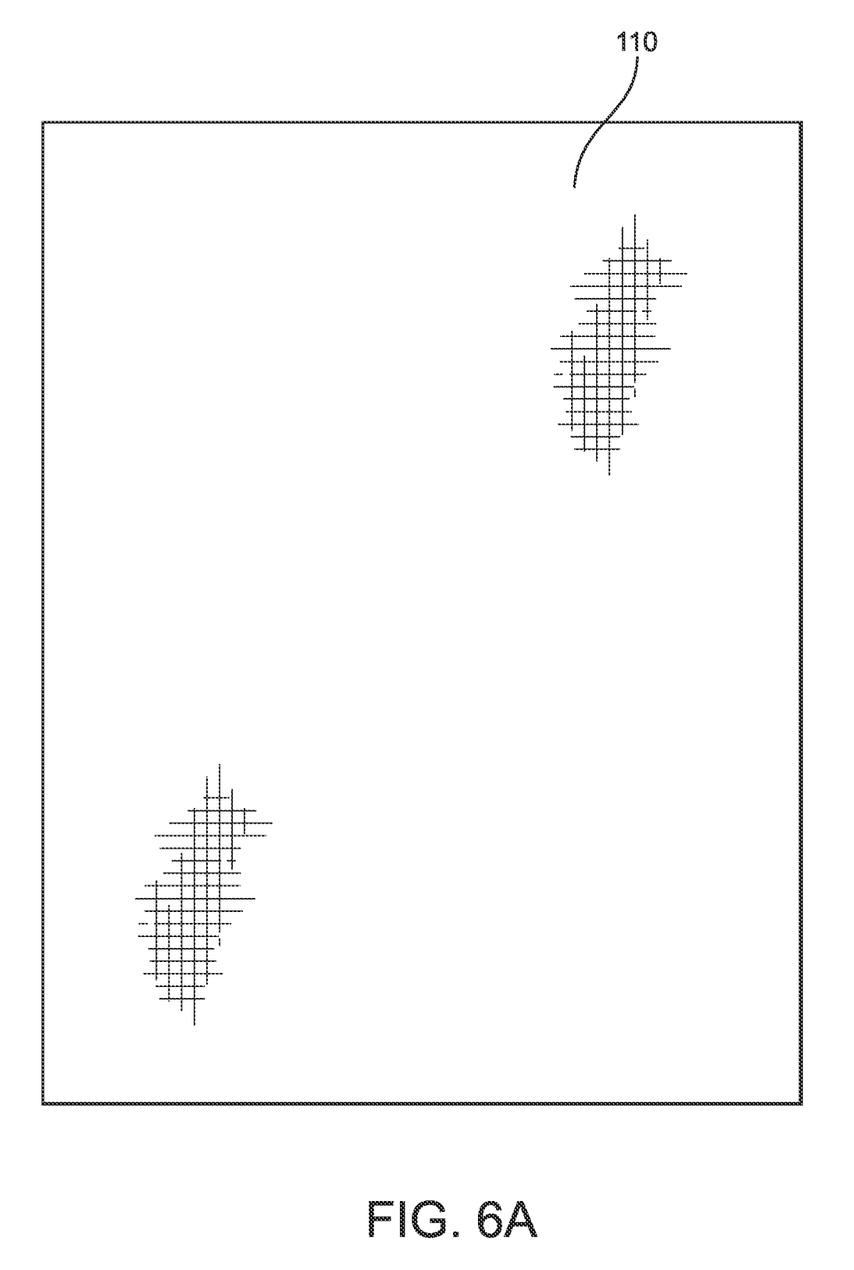
FIGS. 6A and 6B are plan views of different synthetic material layers, which when combined, collectively define an underlayment material with which one or more embodiments of the mechanical fastener of the present invention may be utilized.
Figure 6B:
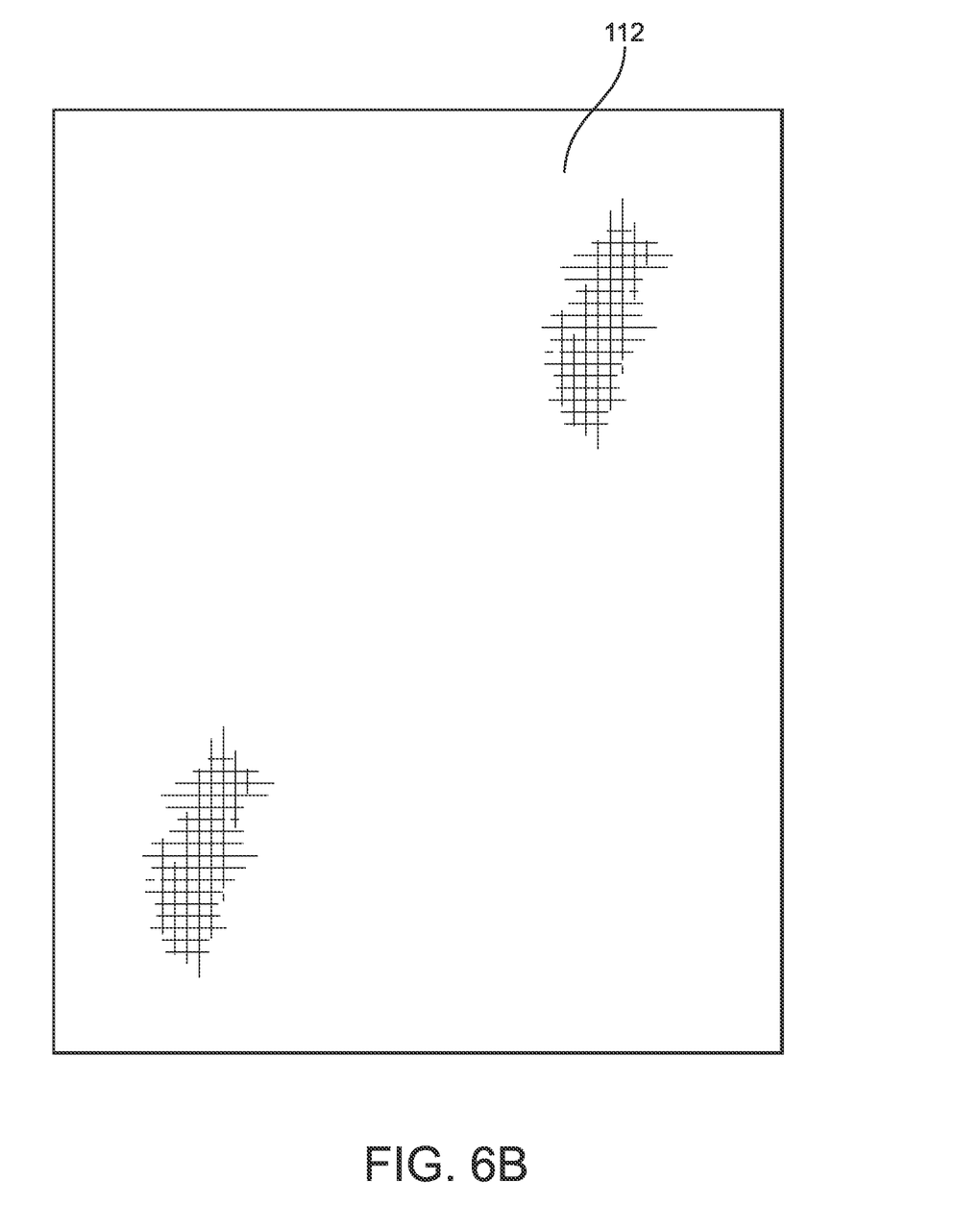

Yet additional structural and operative features of the underlayment system of the present invention include the utilization of at least one but more practically a plurality of retainer clips 20. Each of the one or more of the retainer clips 20 is formed of a metallic or other appropriate at least partially rigid and at least partially flexible material. Further, each of the retaining clips 20 includes outwardly extending wings or legs 22 being attached to magnets 24. As applied, the retaining clip 20 is operatively positioned, by being magnetically connected, concurrently to two of the plurality of mechanical fasteners 10 or 10', which may or may not be magnetized, as set forth above. When so disposed, each of the different magnets 24 are magnetically connected to the outer plate 12 or 12', which as set forth above may be formed from a metallic material. As also represented in FIG. 5, the two mechanical fasteners 10 or 10' engaging a corresponding retainer clip 20 are disposed in adjacent but spaced relation to one another. Further, one or more of the retainer clips 20 comprises a substantially open, U-shaped segment 26 disposed in spaced, overlying relation to the underlayment material 100. As such, the U-shaped segment 26 is disposed and structured to overlie and thereby retain an object or structure specifically including, but not limited to, a portion of a solar tube or conduit 108 in an intended location on the underlayment material 100.

A structural modification of the retainer clip 20, as represented in FIG. 5 may be directed to the removal of the magnets 24 attached to the outwardly extending the legs or wings 22. Rather, the retainer clip 20 and/or the wings 22 may be formed of a metallic material which will be attracted to the magnetized under plate 14 of 14' of the embodiment, through the metallic material outer plate 12 or 12' of the mechanical fastener 10 or 10', as represented and described in detail with regard to FIGS. 2 and 4.

Yet another structural modification of the mechanical fastener is represented in FIGS. 6A, 6B through FIG. 9 and is generally represented as 10". More specifically, one or more components of the mechanical fastener 10" is embedded in the underlayment material 100'. Further the underlayment material 100' may comprise at least two synthetic material layers 110 and 112. Further, one of the synthetic material layers, such as 112, may include adhesive characteristics and/or capabilities which facilitate an adhesive attachment of the synthetic layers 110 and 112 in overlying relation to one another, as at least generally represented in FIGS. 8 and 9.

Figure 7A:
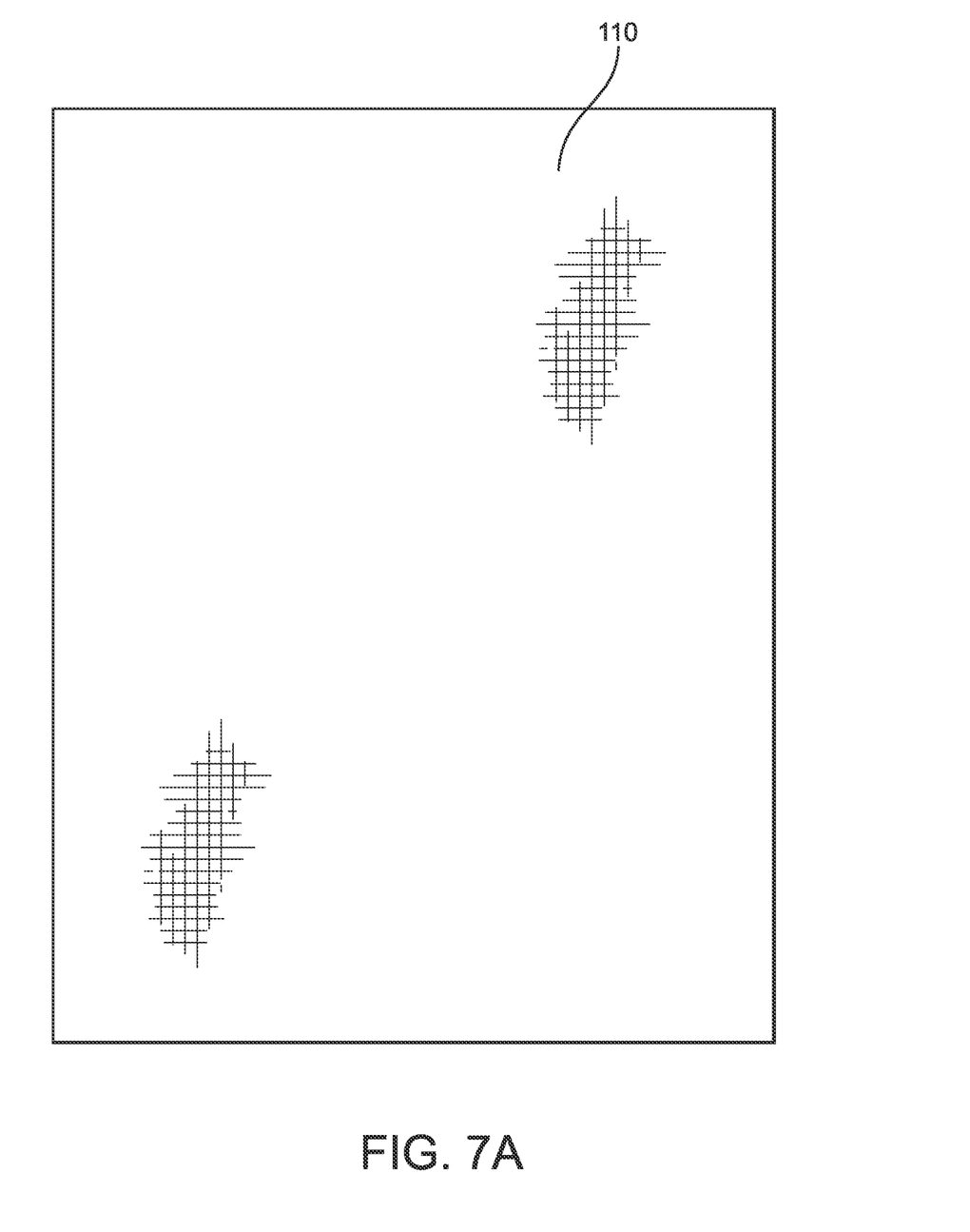
FIGS. 7A and 7B are plan views of the embodiment of FIGS. 6A and 6B respectively, wherein the synthetic layer of FIG. 7B is operatively associated with at least a portion of the mechanical fastener of the present invention.
Figure 7B:
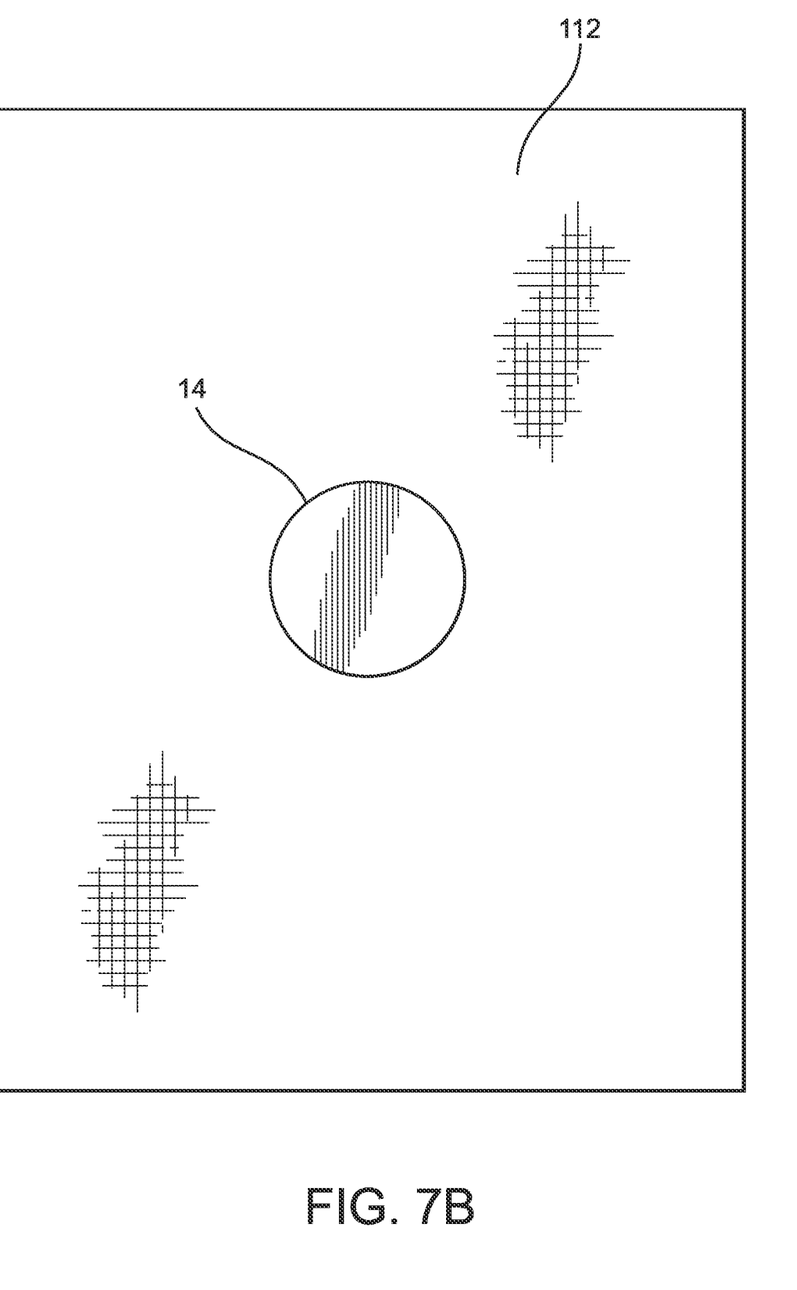

In addition, these adhesive characteristics or capabilities may facilitate and maintain the placement and/or positioning of at least one, but more practically a plurality of under plates 14 on an initially exposed or outer surface of the synthetic material layer 112, as represented in FIG. 7B. Although not specifically represented in FIGS. 6A, 6B through FIG. 9, once the under plate 14 is so positioned, an outer plate 12 may be disposed in overlying engagement with the under plate 14 in the manner represented in the embodiment of at least FIG. 2. As indicated in the above noted embodiments of FIGS. 2-4, the under plate 14 may be formed of a magnetic material and/or have magnetic properties, such as by being at least partially formed of a barium ferrite material. These described magnetic properties facilitates the removable but stable attachment of a metallic material outer plate 12 to the exposed, magnetic face or surface of the under plate 14.

Figure 8:
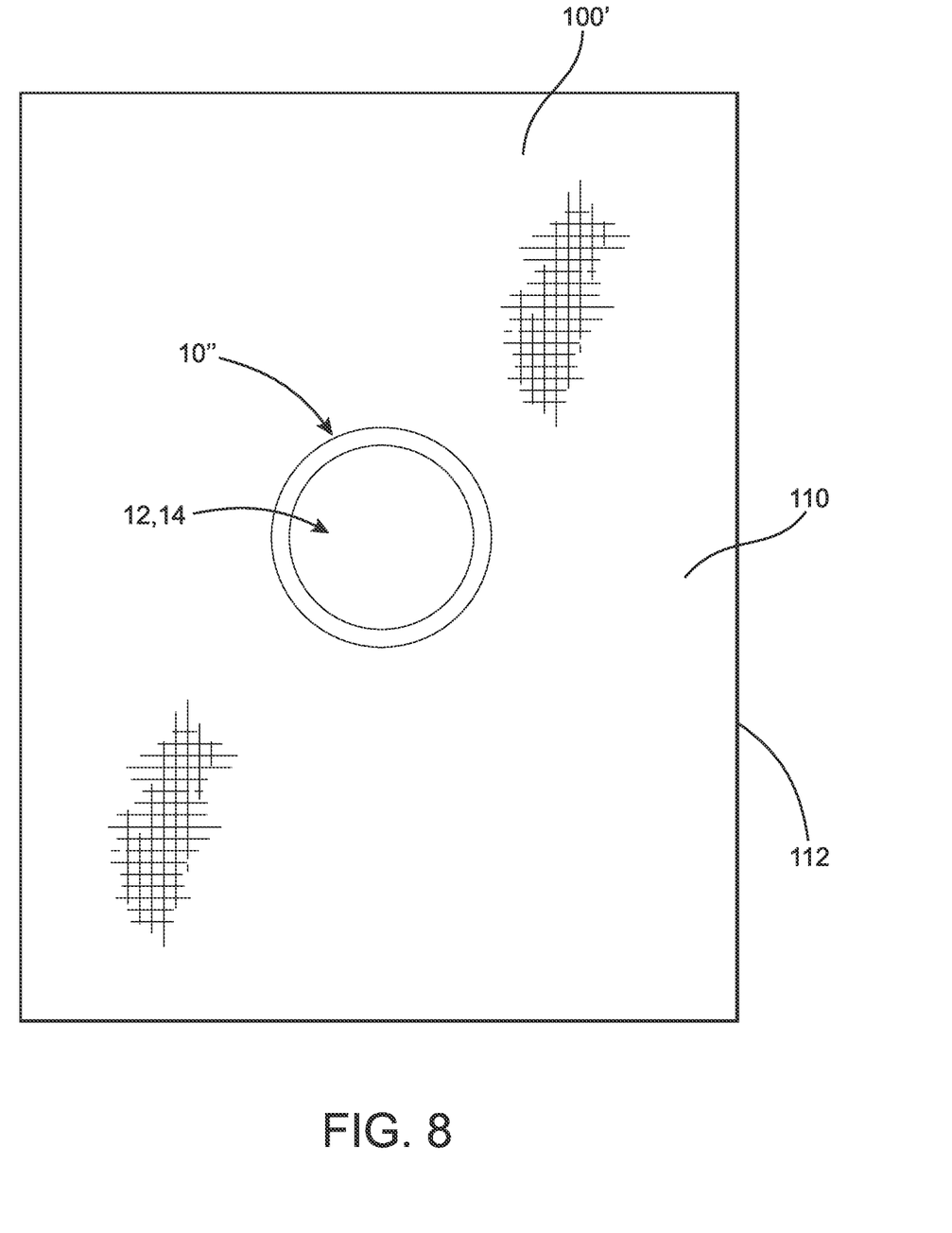
FIG. 8 is a plan view of the embodiment of FIGS. 7A and 7B interconnected along with a component of the mechanical fastener represented in FIG. 7B.

With reference to FIG. 8, once the outer plate 12 and the under plate 14 are interconnected and positioned in the manner described above, a connector 16 (not shown) may be applied by penetrating through both the outer plate 12 and the under plate 14 and concurrently through the underlayment material layer 112. The connector 16 may thereafter be concurrently attached, by penetration, to a roof deck or other underlying supporting support structure 106.

Figure 9:
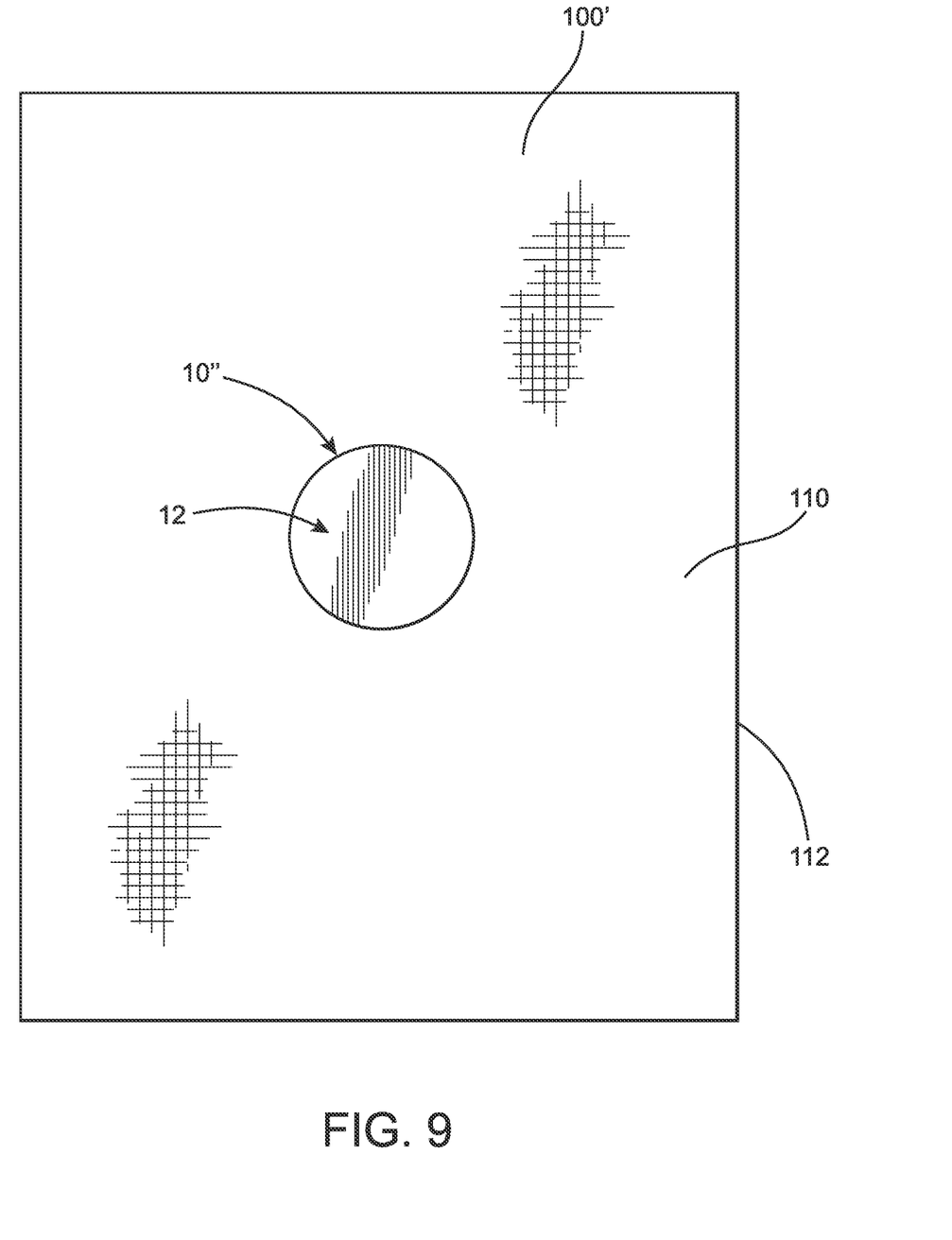
FIG. 9 is a plan view of the embodiment of FIG. 8 with an additional component of the mechanical fastener of the present invention used in combination therewith.

Yet another variation of the mechanical fastener 10" is represented in FIG. 9 is an alternative from that represented in FIG. 8. More specifically, the under plate 14 is placed on the exposed face of synthetic material layer 112 in the manner represented FIG. 7B. Thereafter, the adjoining synthetic material layer 110, as represented in FIG. 7A is placed in overlying, covering relation to the exposed face of the synthetic material layer 112 as well as the under plate 14 disposed thereon and possibly adhered thereto.

It is again to be noted that the under plate 14 may have the aforementioned magnetic capabilities and/or characteristics such as, but not limited to, by being at least partially formed of a barium ferrite material. Accordingly, once the synthetic material layer 110 is disposed in covering relation to both the synthetic material layer 112 and the under plate 14, the magnetic properties associated with the under plate 14 allow the outer plate 12 to be maintained in aligned, overlying relation to the under plate 14, due to magnetic attraction of the outer plate 12 to the under plate 14, as represented in FIG. 9. Due to the aforementioned magnetic characteristics and/or capabilities of the under plate 14, the outer plate 12, being formed of a metallic material, will be magnetically attracted to the under plate 14 even though the synthetic material layer 110 is disposed therebetween. Therefore, in the embodiment of FIG. 9, a connector 16 (not shown) may be applied by penetrating through the outer plate 12, the outermost synthetic material layer 110, the under plate 14 and concurrently through the underlayment material layer 112. The connector 16 may then be concurrently attached, by penetration, to a roof deck or other underlying supporting support structure 106.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system of underlayment for a roof structure, said system comprising:
    a first underlayment material disposed in covering relation to a roof deck of the roof structure,
    at least one mechanical fastener disposed in interconnecting relation to said first underlayment material, a second underlayment material, and the roof structure,
    said at least one mechanical fastener including an independent and separable outer plate and under plate, and a connector,
    said outer plate including magnetically attractive properties,
    said under plate comprising a composition that includes at least a flexible chlorinated polyethylene material inclusive of isotropic barium ferrite to allow said under plate to exhibit magnetic properties,
    said under plate disposed on an exposed face of said first underlayment material,
    said second underlayment material disposed in covering relation to said exposed face of said first underlayment material and said under plate,
    said outer plate disposed on an exposed face of said second underlayment material and removably disposed in an aligned, overlying relation to said under plate through said second underlayment material as a result of said magnetic properties, so as to facilitate aligned positioning of said under plate on said first underlayment material and said outer plate on said second underlayment material during introduction of said connector, and
    said connector penetrating through said outer plate, said second underlayment material, said under plate, and said first underlayment material into secured relation to the roof structure.

2. The system as recited in claim 1 wherein said under plate is dimensioned and configured to extend beneath an entirety of an outer peripheral edge of said outer plate at least when said outer plate is removably disposed in an aligned, overlying relation to said under plate through said second underlayment material.

3. The system as recited in claim 2 wherein said under plate is disposed beneath an undersurface of said outer plate and said second underlayment material, including an entirety of said outer peripheral edge of said outer plate, and in overlying relation to said first underlayment material.

4. The system as recited in claim 2 wherein said under plate includes an outer periphery having a larger dimension than said outer peripheral edge of said outer plate and disposed in outwardly extending, surrounding relation to said outer peripheral edge of said outer plate.

5. The system as recited in claim 2 wherein said under plate includes an outer periphery disposed in outwardly extending, surrounding relation to an entirety of said outer peripheral edge of said outer plate.

6. The system as recited in claim 1 wherein said outer plate is magnetic.

7. The system as recited in claim 1 wherein said under plate is magnetic.

8. The system as recited in claim 1 further comprising an adhesive disposed on an undersurface of said under plate so as to allow said under plate to be disposed on an exposed face of said first underlayment material in an adhesively connecting disposition.

9. The system as recited in claim 1 wherein said first underlayment material comprises a woven polypropylene material.

10. The system as recited in claim 1 wherein said under plate disposed in self-sealing engagement with said connector penetrating therethrough.

11. A system of underlayment for a roof structure, said system comprising:
    a first underlayment material disposed in covering relation to a roof deck of the roof structure,
    at least two mechanical fasteners disposed in interconnecting relation to said first underlayment material, a second underlayment material, and the roof structure,
    said at least two mechanical fasteners each including an independent and separable outer plate and under plate, and a connector,
    said outer plate including magnetically attractive properties,
    said under plate disposed on an exposed face of said first underlayment material,
    said second underlayment material disposed in covering relation to said exposed face of said first underlayment material and said under plate,
    said under plate comprising a flexible, at least partially non-metallic, magnetic inclusive material,
    said outer plate disposed on an exposed face of said second underlayment material and removably disposed in an aligned, overlying relation to said under plate through said second underlayment material as a result of said magnetic properties, so as to facilitate aligned positioning of said under plate on said first underlayment material and said outer plate on second underlayment material during introduction of said connector,
    said connector penetrating through said outer plate, said second underlayment material, said under plate, and said first underlayment material into secured relation to the roof structure, and
    a retainer clip at least partially formed of a metallic material, said retainer clip magnetically connected concurrently to two of said at least two mechanical fasteners, wherein said at least two mechanical fasteners disposed in substantially adjacent, spaced relation to one another.

12. The system as recited in claim 11 wherein said first underlayment material comprises a woven polypropylene material.

13. The system as recited in claim 11 wherein said under plate comprising a composition that includes a chlorinated polyethylene material operative to allow said underplate to be flexible and self-sealing.

14. The system as recited in claim 13 wherein said underplate comprising a composition that also includes isotopic barium ferrite to allow said under plate to exhibit magnetic properties.

15. The system as recited in claim 11 wherein said under plate further comprising an adhesive disposed on an undersurface of said under plate so as to allow said under plate to be disposed on an exposed surface of said first underlayment material in an adhesively connecting disposition.

16. The system as recited in claim 11 wherein said retainer clip comprising a substantially U-shaped segment disposed in spaced, overlying relation to said second underlying material, said U-shaped segment disposed and structured to retain an object in overlying relation to said second underlayment material and between said two mechanical fasteners.

17. A system of underlayment for a roof structure, said system comprising:
- a first underlayment material disposed in covering relation to a roof deck of the roof structure,
- at least one mechanical fastener disposed in disposed in interconnecting relation to said first underlayment material, a second underlayment material, and the roof structure,
- said at least one mechanical fastener including an independent and separable outer plate and under plate, and a connector,
- said outer plate including magnetically attractive properties,
- said under plate comprising a composition that includes at least a flexible chlorinated polyethylene material inclusive of isotropic barium ferrite to allow said under plate to exhibit magnetic properties,
- said under plate disposed on an exposed face of said first underlayment material, said second underlayment material disposed in covering relation to said exposed face of said first underlayment material and said under plate,
- said outer plate disposed on an exposed face of said second underlayment material and in an overlying relation to said under plate through said second underlayment material, and
- said connector penetrating through said outer plate, said second underlayment material, said under plate, and said first underlayment material into secured relation to the roof structure.

* * * * *